United States Patent
Tsai et al.

(10) Patent No.: US 8,941,267 B2
(45) Date of Patent: Jan. 27, 2015

(54) HIGH-POWER INDUCTION-TYPE POWER SUPPLY SYSTEM AND ITS BI-PHASE DECODING METHOD

(75) Inventors: Ming-Chiu Tsai, New Taipei (TW); Chi-Che Chan, New Taipei (TW)

(73) Assignee: Fu Da Tong Technology Co., Ltd., Zhonghe Dist., New Taipei (TW)

( * ) Notice: Subject to any disclaimer, the term of this patent is extended or adjusted under 35 U.S.C. 154(b) by 646 days.

(21) Appl. No.: 13/212,564

(22) Filed: Aug. 18, 2011

(65) Prior Publication Data

US 2011/0299636 A1      Dec. 8, 2011

Related U.S. Application Data

(63) Continuation-in-part of application No. 13/154,965, filed on Jun. 7, 2011, now Pat. No. 8,810,072.

(51) Int. Cl.
  *H01F 38/14* (2006.01)
  *H04L 27/06* (2006.01)
  *H02J 17/00* (2006.01)
  *H02J 7/02* (2006.01)
  *H02J 5/00* (2006.01)

(52) U.S. Cl.
  CPC ............... *H02J 17/00* (2013.01); *H02J 7/025* (2013.01); *H02J 5/005* (2013.01)
  USPC ........................................................ 307/104

(58) Field of Classification Search
  USPC ........................................................ 307/104
  See application file for complete search history.

(56) References Cited

U.S. PATENT DOCUMENTS

| 5,734,254 | A  | 3/1998  | Stephens |
| 6,122,329 | A  | 9/2000  | Zai |
| 6,184,651 | B1 | 2/2001  | Fernandez |
| 6,345,203 | B1 | 2/2002  | Mueller |
| 7,791,311 | B2 | 9/2010  | Sagoo |
| 7,847,438 | B2 | 12/2010 | Jin |
| 8,004,235 | B2 | 8/2011  | Baarman |
| 8,098,043 | B2 | 1/2012  | Lin |
| 8,183,827 | B2 | 5/2012  | Lyon |
| 8,188,619 | B2 | 5/2012  | Azancot |

(Continued)

FOREIGN PATENT DOCUMENTS

| CN | 102315692 A | 1/2012 |
| CN | 102710409 A | 10/2012 |

(Continued)

*Primary Examiner* — Jared Fureman
*Assistant Examiner* — Carlos Laguerre
(74) *Attorney, Agent, or Firm* — Winston Hsu; Scott Margo

(57) ABSTRACT

A high-power induction-type power supply system includes a supplying-end module consisting of a supplying-end microprocessor, a power driver unit, a signal analysis circuit, a coil voltage detection circuit, a display unit, a power supplying unit, a resonant circuit, a supplying-end coil and a shunt resistor unit, and a receiving-end module consisting of a receiving-end microprocessor, a voltage detection circuit, a rectifier and filter circuit, an amplitude modulation circuit, a protection circuit breaker, a voltage stabilizer circuit, a DC-DC buck converter, a resonant circuit and a receiving-end coil. Subject to time series arrangement, the high-power induction-type power supply system allows transmission of data signal in a stable manner during a charging operation, assuring system operation stability and low power loss. By means of bi-phase decoding, data code is accurately decoded when the receiving-end module is at full load, ensuring system operating reliability.

14 Claims, 12 Drawing Sheets

(56) References Cited

U.S. PATENT DOCUMENTS

| | | | |
|---|---|---|---|
| 8,217,535 B2 | 7/2012 | Uchida et al. | |
| 8,217,621 B2 | 7/2012 | Tsai et al. | |
| 8,248,024 B2 | 8/2012 | Yuan et al. | |
| 8,358,103 B2 | 1/2013 | Eastlack | |
| 8,373,387 B2 | 2/2013 | Bourilkov et al. | |
| 8,412,963 B2 | 4/2013 | Tsai et al. | |
| 8,417,359 B2 | 4/2013 | Tsai et al. | |
| 8,541,975 B2* | 9/2013 | Park et al. | 320/108 |
| 8,772,979 B2 | 7/2014 | Tsai | |
| 2007/0177533 A1 | 8/2007 | Palay | |
| 2008/0079392 A1 | 4/2008 | Baarman | |
| 2009/0009006 A1* | 1/2009 | Jin et al. | 307/104 |
| 2009/0174263 A1 | 7/2009 | Baarman | |
| 2009/0267561 A1* | 10/2009 | Lin | 320/108 |
| 2010/0007307 A1 | 1/2010 | Baarman | |
| 2011/0158329 A1* | 6/2011 | Oettinger et al. | 375/258 |
| 2011/0159812 A1* | 6/2011 | Kim et al. | 455/41.1 |
| 2011/0176589 A1 | 7/2011 | Kolof | |
| 2011/0204723 A1* | 8/2011 | Irish | 307/104 |
| 2011/0285212 A1* | 11/2011 | Higuma et al. | 307/104 |
| 2013/0055815 A1 | 3/2013 | Yanagisawa | |
| 2013/0234532 A1* | 9/2013 | Fells et al. | 307/104 |

FOREIGN PATENT DOCUMENTS

| | | |
|---|---|---|
| TW | M246884 | 10/2004 |
| TW | 200527302 | 8/2005 |
| TW | 201123673 | 7/2011 |
| TW | 201123676 | 7/2011 |
| TW | 201128972 | 8/2011 |
| TW | 201138258 | 11/2011 |
| TW | 201234871 | 8/2012 |
| TW | 201243281 | 11/2012 |

* cited by examiner

HIGH-POWER INDUCTION-TYPE POWER SUPPLY SYSTEM AND ITS BI-PHASE DECODING METHOD

This application is a Continuation-In-Part of application Ser. No. 13/154,965, filed on Jun. 7, 2011 now U.S. Pat. No. 8,810,072. The patent application identified above is incorporated here by reference in its entirety to provide continuity of disclosure.

BACKGROUND OF THE INVENTION

1. Field of the Invention

The present invention relates to power supply systems and more particularly, to a high-power induction-type power supply system and its bi-phase decoding method that allows synchronous transmission of power supply and data signal and automatically regulates the power at the supplying-end coil and the power at the receiving-end coil. By means of bi-phase data decoding, data can be accurately decoded during full load of the receiving-end module, assuring high stability of the operation of the system.

2. Description of the Related Art

Following fast development of electronic and internet technology, many digitalized electronic products, such as digital camera, cellular telephone, multimedia player (MP3, MP4) and etc., have been continuously developed and have appeared on the market. These modern digital electronic products commonly have light, thin, short and small characteristics. However, for high mobility, power supply is an important factor. A mobile digital electronic product generally uses a rechargeable battery to provide the necessary working voltage. When power low, the rechargeable battery can be recharged. For charging the rechargeable battery of a digital electronic product, a battery charger shall be used. However, it is not economic to purchase a respective battery charger when buying a new mobile electronic product. Further, when one spends a large amount of money to purchase different mobile electronic products, a special storage space is necessary for the storage of the mobile electronic products. Further, it is inconvenient to carry and store many different mobile electronic products and the related battery chargers. Further, it takes much time to find one specific battery charger from a storage group of battery chargers.

Further, when using a battery charger to charge a mobile electronic apparatus, the user must connect the connection interface (plug) of the battery charger to an electric outlet and then connect the connector at the other end of the battery charger to the mobile electronic apparatus, enabling the mobile electronic apparatus to be charged. After charging, the mobile electronic apparatus is disconnected from the battery charger. As conventional battery chargers must be used where an electric outlet is available, the application of conventional battery chargers is limited. When in an outdoor space, conventional battery chargers cannot be used for charging mobile electronic apparatuses.

Further, except battery charging, a mobile electronic apparatus may need to make setting of related functions, data editing or data transmission. A user may directly operate the mobile electronic apparatus to make function setting or to input data. However, some mobile electronic apparatus (such as MP3 player, MP4 player, digital camera, electronic watch, mobile game machine, wireless game grip, wireless controller) do not allow direct setting or data transmission. When making function setting or data transmission, an external electronic device (computer, PDA) must be used. Further, when charging a mobile electronic apparatus, it may be not operable to transmit data. Further, wireless induction power supply systems (or the so-called wireless chargers) are commercially available. These wireless induction power supply systems commonly use two coils, one for emitting power supply and the other for receiving power supply. However, the energy of wireless power supply is dangerous and will heat metal objects. They work like an electromagnetic stove. The use of a wireless induction power supply system has the risk of overheat damage of the charged device.

Further, to ensure the safe operation of a wireless induction power supply system, power supplying operation can be started only after ID recognition between the supplying-end module and the receiving-end module. Under the requirement of this function, it is necessary to establish a data code transmission method for data transmission between the supplying-end module and the receiving-end module in a stable manner. According to conventional designs, the load at the receiving-end coil is modulated and fed back to the supplying-end coil, and a sensing circuit senses the variation of the signal and then picks up the data code by means of a predetermined decoding procedure. This method is applicable only when the load at the power output terminal of the receiving-end module is stable. If the load at the power output terminal of the receiving-end module is changed, the aforesaid method becomes not applicable. Because the load at the power output terminal of the receiving-end module affects the modulated signal at the receiving-end module, the transmission of the data code will be unstable.

Further, when the power output of the receiving-end module is fully loaded, the change of the output impedance causes a polarity change at the supplying-end module. After a change of the polarity, the supplying-end module becomes unable to demodulate the signal, causing interruption of the transmission of the control data and affecting normal functioning of the charging operation.

Therefore, it is desirable to a high-power induction-type power supply system that eliminates the problem of data code transmission instability during a synchronous charging and data transmission operation and the problem of data signal transmission interruption due to a load characteristic change between the supplying-end module and the receiving-end module during a synchronous charging and data transmission operation.

SUMMARY OF THE INVENTION

The present invention has been accomplished under the circumstances in view. It is one object of the present invention to provide a high-power induction-type power supply system and its bi-phase decoding method, which allows transmission of data signal in a stable manner during a charging operation, and achieves data code decoding accurately when the receiving-end module is at full load, ensuring system operating reliability.

To achieve this and other objects of the present invention, a high-power induction-type power supply system comprises a supplying-end module consisting of a supplying-end microprocessor, a power driver unit, a signal analysis circuit, a coil voltage detection circuit, a display unit, a power supplying unit, a resonant circuit, a supplying-end coil and a shunt resistor unit, and a receiving-end module consisting of a receiving-end microprocessor, a voltage detection circuit, a rectifier and filter circuit, an amplitude modulation circuit, a protection circuit breaker, a voltage stabilizer circuit, a DC-DC buck converter, a resonant circuit and a receiving-end coil. Subject to time series arrangement, the high-power induction-type power supply system allows transmission of data signal in a stable manner during a charging operation, avoiding power loss.

Further, the supplying-end microprocessor of the supplying-end module has built-in comparators for accurate decoding of data signal code during full load of the receiving-end module, ensuring system operating reliability.

By means of connecting the positive signal input ends of the built-in comparators of the supplying-end microprocessor to the output end of the signal analysis circuit and the negative signal input ends of the comparators to the forward phase decoding shunt resistors and reverse phase decoding shunt resistors of the shunt resistor unit respectively, the two comparators compare the voltage at the positive signal input ends with the voltage at the negative signal input ends and then output the comparison result for accurate digital logic level determination so that the built-in software programs of the supplying-end microprocessor can accurately decode the data code of the data signal provided by the receiving-end module.

DETAILED DESCRIPTION OF THE PREFERRED EMBODIMENT

Figure 1:
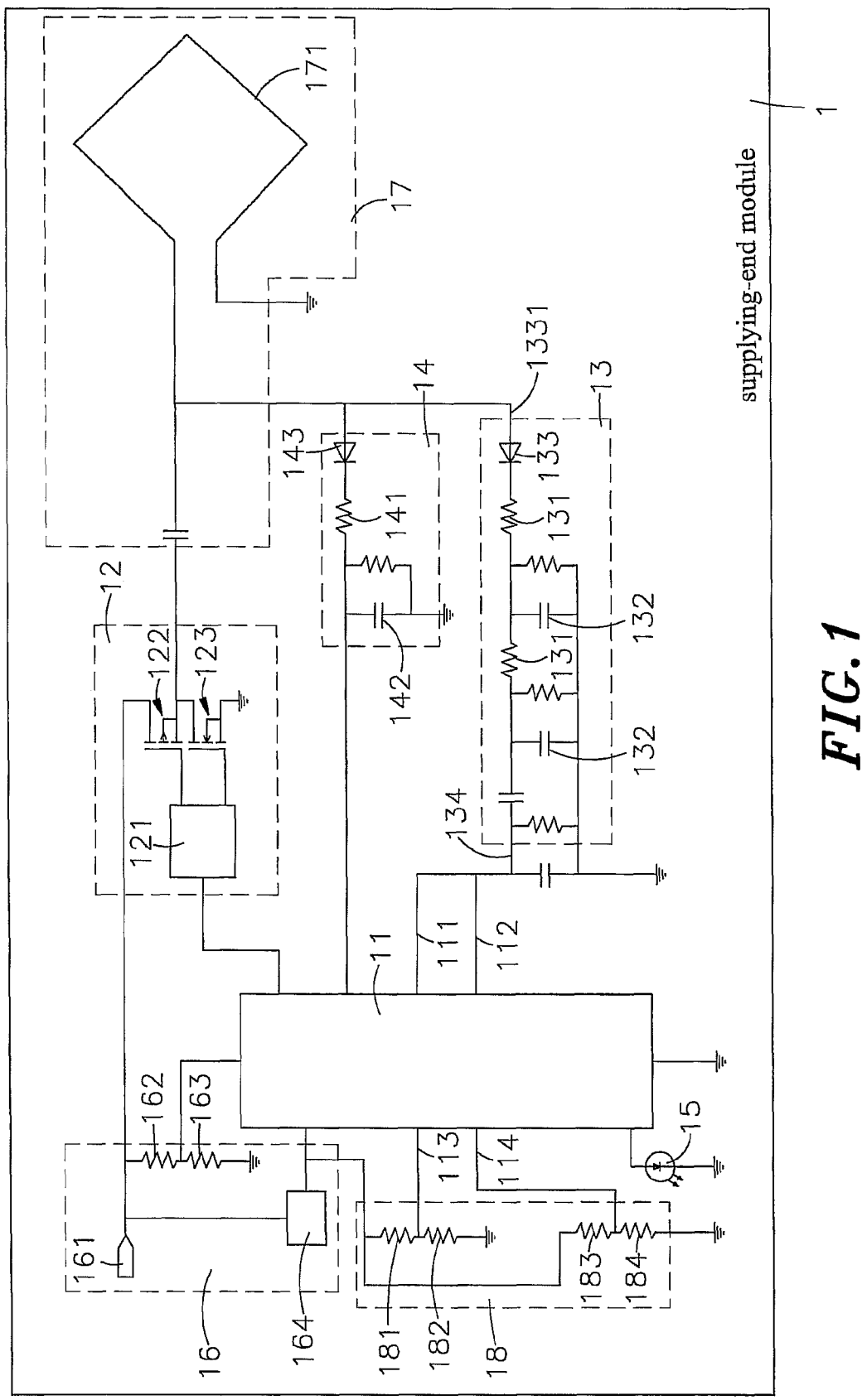
FIG. 1 is a circuit block diagram of a supplying-end module for high-power induction-type power supply system in accordance with the present invention.
Figure 2:
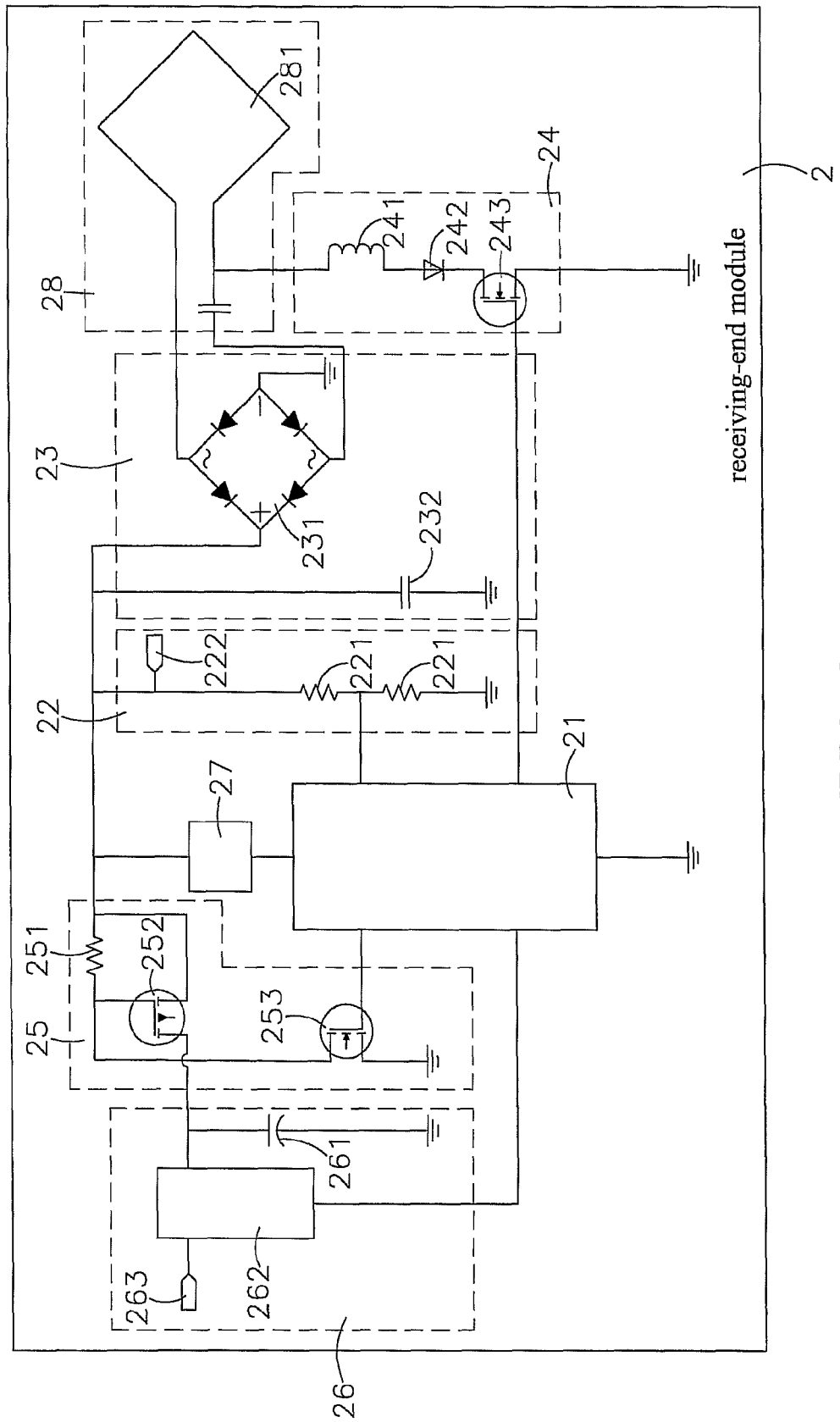
FIG. 2 is a circuit block diagram of a receiving-end module for high-power induction-type power supply system in accordance with the present invention.
Figure 3:
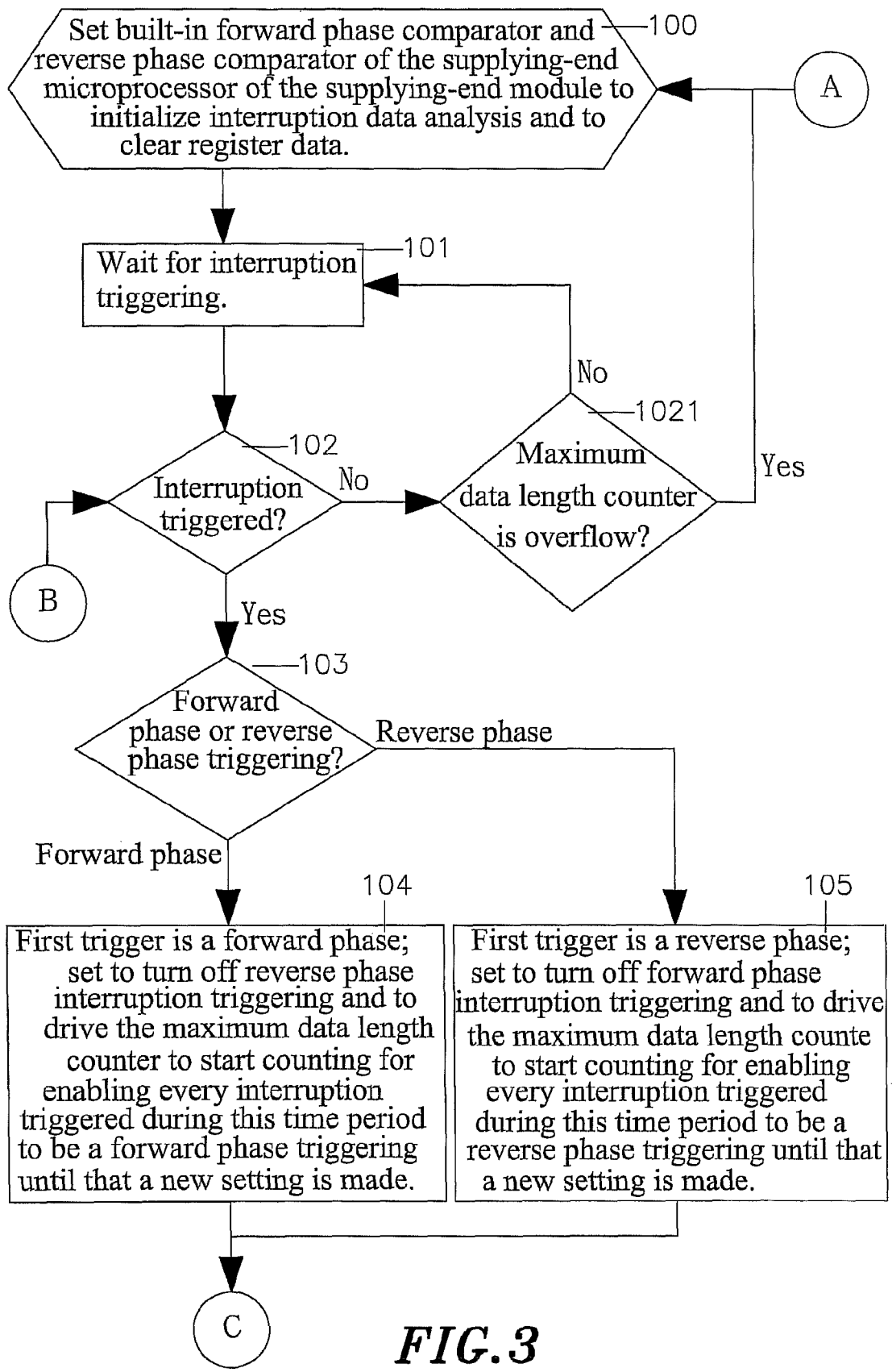
FIG. 3 is an operation flow chart of the supplying-end module of the high-power induction-type power supply system in accordance with the present invention (I).
Figure 4:
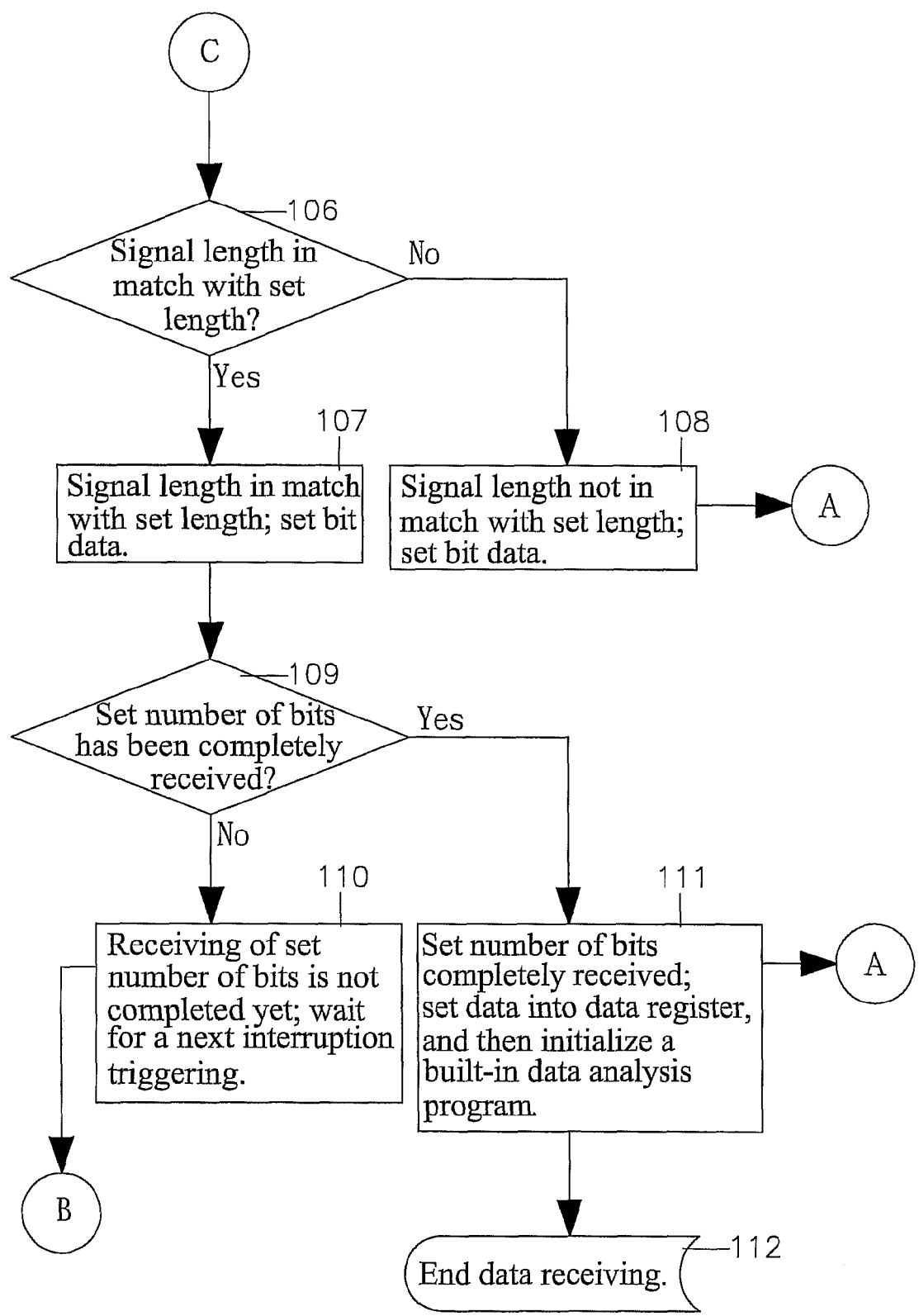
FIG. 4 is an operation flow chart of the supplying-end module of the high-power induction-type power supply system in accordance with the present invention (II).

Referring to FIGS. 1~4, a high-power induction-type power supply system is shown comprising a supplying-end module 1 and a receiving-end module 2.

The supplying-end module 1 comprises a supplying-end microprocessor 11 having installed therein an operation/control/data decoding and analysis-related software program, a power driver unit 12, a signal analysis circuit 13, a coil voltage detection circuit 14, a display unit 15, a power supplying unit 16, a resonant circuit 17, a supplying-end coil 171 and a shunt resistor unit 18. The supplying-end microprocessor 11 further has built therein two comparators that have a respective positive signal input end 111;112 and a respective negative signal input end 113;114. The power driver unit 12, the signal analysis circuit 13, the coil voltage detection circuit 14, the display unit 15, the power supplying unit 16 and the shunt resistor unit 18 are respectively electrically coupled to the supplying-end microprocessor 11. The power driver unit 12 comprises a MOSFET (Metal-Oxide-Semiconductor Field-Effect Transistor) driver 121, a high-end MOSFET component 122 and a low-end MOSFET component 123. The MOSFET driver 121 is electrically coupled with the supplying-end microprocessor 11, the high-end MOSFET component 122 and the low-end MOSFET component 123. The high-end MOSFET component 122 and the low-end MOSFET component 123 are respectively electrically coupled with the resonant circuit 17. The high-end MOSFET component 122 is also electrically coupled with the power supplying unit 16 and the resonant circuit 17. The signal analysis circuit 13 comprises a rectifier diode 133 electrically coupled with an input end 1331 thereof to the resonant circuit 17, a series of resistors 131 electrically connected in series to the rectifier diode 133, and a plurality of capacitors 132 electrically connected in parallel to the series of resistors 131. The signal analysis circuit 13 has an output end 134 thereof electrically connected to the positive signal input ends 111;112 of the comparators of the supplying-end microprocessor 11. The negative signal input end 113 of one comparator of the supplying-end microprocessor 11 is electrically connected to forward phase decoding shunt resistors 181;182 of the shunt resistor unit 18. The negative signal input end 114 of the other comparator of the supplying-end microprocessor 11 is electrically connected to reverse phase decoding shunt resistors 183;184 of the shunt resistor unit 18. Further, the display unit 15 can be selected from the group of liquid crystal display screen, LED display screen and cold light display screen. The shunt resistor unit 18 is electrically coupled with the supplying-end microprocessor 11 and a DC-DC buck converter 164 of the power supplying unit 16. The coil voltage detection circuit 14 comprises a rectifier diode 143 electrically coupled with the resonant circuit 17, a series of resistors 141 electrically connected in series to the rectifier diode 143, and the capacitors 142 electrically connected in parallel to the series of resistors 141. The power supplying unit 16 is also electrically coupled with the power driver unit 12, comprising a power source 161, two current sensing shunt resistors 162;163 electrically connected in series to the power source 161, and the aforesaid DC-DC buck converter 164 that is electrically connected to the power source 161. The supplying-end coil 171 is electrically coupled with the resonant circuit 17, and adapted for transmitting power supply and data signal wirelessly.

The receiving-end module 2 comprises a receiving-end microprocessor 21 having installed therein an operation/control-related software program, a voltage detection circuit 22, a rectifier and filter circuit 23, an amplitude modulation circuit 24, a protection circuit breaker 25, a voltage stabilizer circuit 26, a DC-DC buck converter 27, a resonant circuit 28 and a receiving-end coil 281. The voltage detection circuit 22, the rectifier and filter circuit 23, the amplitude modulation circuit 24, the protection circuit breaker 25, the voltage stabilizer circuit 26 and the DC-DC buck converter 27 are respectively electrically coupled with the receiving-end microprocessor 21. The voltage detection circuit 22 comprises a plurality of resistors 221 electrically connected in series to the receiving-end microprocessor 21, and a sensing point 222 electrically connected with the plurality of resistors 221, the rectifier and filter circuit 23, the protection circuit breaker 25 and the DC-DC buck converter 27 in series. The rectifier and filter circuit 23 comprises a rectifier 231 and a filter capacitor 232 respectively electrically connected in parallel to the voltage detection circuit 22, the protection circuit breaker 25 and the DC-DC buck converter 27. The resonant circuit 28 and the receiving-end coil 281 are electrically connected in parallel to the rectifier 231 of the rectifier and filter circuit 23, and electrically connected with the amplitude modulation circuit 24 in series. The amplitude modulation circuit 24 comprises an inductor 241, a rectifying diode 242 and a MOSFET component 243. The inductor 241, the rectifying diode 242 and the MOSFET component 243 are electrically connected in series. The protection circuit breaker 25 comprises a resistor 251, a P-type MOSFET component 252 and an N-type MOSFET component 253. The resistor 251, the P-type MOSFET component 252 and the N-type MOSFET component 253 are electrically connected in series. Further, the N-type MOSFET component 253 is electrically coupled with the receiving-end microprocessor 21. The voltage stabilizer circuit 26 comprises a buffer capacitor 261, a DC-DC step-down converter 262 and a power output terminal 263. The P-type MOSFET component 252 is electrically connected with the buffer capacitor 261 and DC-DC step-down converter 262 of the voltage stabilizer circuit 26. The voltage detection circuit 22, the protection circuit breaker 25, the voltage stabilizer circuit 26 and the DC-DC buck converter 27 are respectively electrically connected to the receiving-end microprocessor 21. The voltage detection circuit 22, the protection circuit breaker 25 and the DC-DC buck converter 27 are respectively electrically connected to the rectifier and filter circuit 23. The rectifier and filter circuit 23 and the amplitude modulation circuit 24 are respectively electrically coupled with the resonant circuit 28, which is electrically coupled with the receiving-end coil 281.

Subject to the functioning of the amplitude modulation circuit 24 and the protection circuit breaker 25, the receiving-end microprocessor 21 of the receiving-end module 2 achieves controls of data signal. Subject to the functioning of the voltage stabilizer circuit 26 and by means of time series arrangement, the receiving-end microprocessor 21 provides a stabilized control data signal to the amplitude modulation circuit 24 for modulation, enabling the modulated data signal to be fed back to the supplying-end coil 171 by the receiving-end coil 281. After receipt of the data signal transmitted by the receiving-end coil 281, the modulated data signal is demodulated by the signal analysis circuit 13, and the data signal thus obtained is transmitted through the positive signal input ends 111;112 into the built-in comparators of the supplying-end microprocessor 11. At the same time, a reference voltage value generated by the forward phase decoding shunt resistors 181;182 and reverse phase decoding shunt resistors 183;184 of the shunt resistor unit 18 is inputted into the built-in comparators of the supplying-end microprocessor 11 through the respective negative signal input ends 113;114, enabling the built-in comparators of the supplying-end microprocessor 11 to compare the data value of the received data signal with the reference voltage value and to produce a determined signal of digital logic level. By means of the bi-phase decoding processing of the built-in data analyzing software, the supplying-end microprocessor 11 accurately decodes the code of the data signal even when the receiving-end module 2 is in a full load output status, assuring high stability of the transmission of data code of data signal and minimizing power loss during power transmission. Further, any change of load current, due to the use of the receiving-end module 2 in a different mobile electronic apparatus (such as, cell phone, PDA, notebook, digital camera, MP3 player, MP4 player, palmtop game machine, etc.), does not affect the data code analysis performance of the supplying-end microprocessor 11. Further, because the receiving-end module 2 has its power conversion circuit and its data transmission circuit separately arranged for independent operation, the system power transmission capability is maximized.

The forward phase decoding or reverse phase decoding during a bi-phase decoding operation between the supplying-end module 1 and receiving-end module 2 of the high-power induction-type power supply system is determined by means of a first interruption triggering subject to the following steps:

(100) Set the forward phase comparator and reverse phase comparator built in the supplying-end microprocessor 11 of the supplying-end module 1 to initialize interruption data analysis and to clear register data.

(101) The two built-in comparators of the supplying-end microprocessor 11 wait for interruption triggering.

(102) The supplying-end microprocessor 11 determines whether or not an interruption triggered? And then, the supplying-end microprocessor 11 proceeds to step (103) when positive, or step (1021) when negative.

(1021) The supplying-end microprocessor 11 determines whether or not the maximum data length counter is overflow? And then, the supplying-end microprocessor 11 returns to step (100) when positive, or step (101) when negative.

(103) The supplying-end microprocessor 11 judges the phase, and then proceeds to step (104) when forward phase is judged, or step (105) when reverse phase is judged.

(104) The first trigger is a forward phase. At this time, the supplying-end microprocessor 11 sets to turn off reverse phase interruption triggering and to drive the maximum data length counter to start counting. After setting, any interruption triggered during this time period is a forward phase triggering, and the interruption will be continued till a new setting is made and will then proceed to step (106).

(105) The first trigger is a reverse phase. At this time, the supplying-end microprocessor 11 sets to turn off forward phase interruption triggering and to drive the maximum data length counter to start counting. After setting, any interruption triggered during this time period is a reverse phase triggering, and the interruption will be continued till a new setting is made and will then proceed to step (106).

(106) The supplying-end microprocessor 11 determined whether or not the signal length matches the set length? And then, the supplying-end microprocessor 11 proceeds to step (107) when positive, or step (108) when negative.

(107) The signal length matches the set length. At this time, the supplying-end microprocessor 11 sets the bit data and then proceeds to step (109).

(108) The signal length does not match the set length. At this time, the supplying-end microprocessor 11 determines the signal to be a noise, and then clears existing data and re-sets the program, and then returns to step (100).

(109) The supplying-end microprocessor 11 judges whether or not the set number of bits has been received? And then, the supplying-end microprocessor 11 proceeds to step (110) when negative, or step (111) when positive.

(110) The receiving of the set number of bits is not completed. At this time, the supplying-end microprocessor 11 waits for a next interruption triggering and then returns to step (102).

(111) The receiving of the set number of bits is completed. At this time, the supplying-end microprocessor 11 sets the data into the data register and then initializes the built-in data analysis program and then runs step (112) and step (100) synchronously.

(112) The supplying-end microprocessor 11 finishes the receiving of data.

Figure 5:
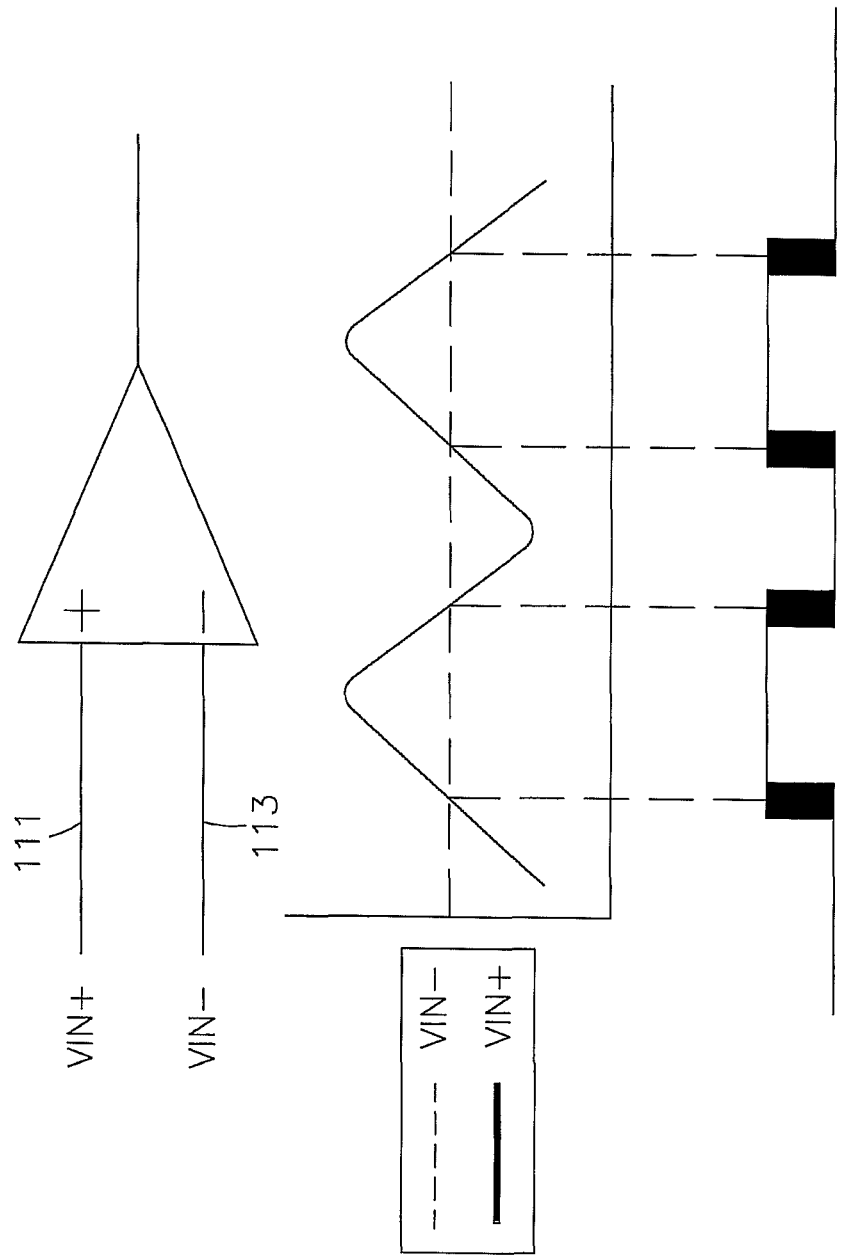
FIG. 5 is a schematic drawing illustrating the arrangement and functioning of one comparator of the supplying-end microprocessor of the supplying-end module of the high-power induction-type power supply system in accordance with the present invention.

As stated above, the supplying-end microprocessor 11 of the supplying-end module 1 has two comparators built therein (FIG. 5 is a simple structural view of one comparator) has two signal input ends, namely, the positive signal input end 111 or 112 for the input of the signal to be processed, and the negative signal input end 113 or 114 for the input of the reference voltage level. After comparison between the voltage inputted through the positive signal input end 111 or 112 and the reference voltage inputted through the negative signal input end 113 or 114, a data signal of digital logic level is outputted for bi-phase decoding processing by the built-in software program of the supplying-end microprocessor 11.

Figure 6:
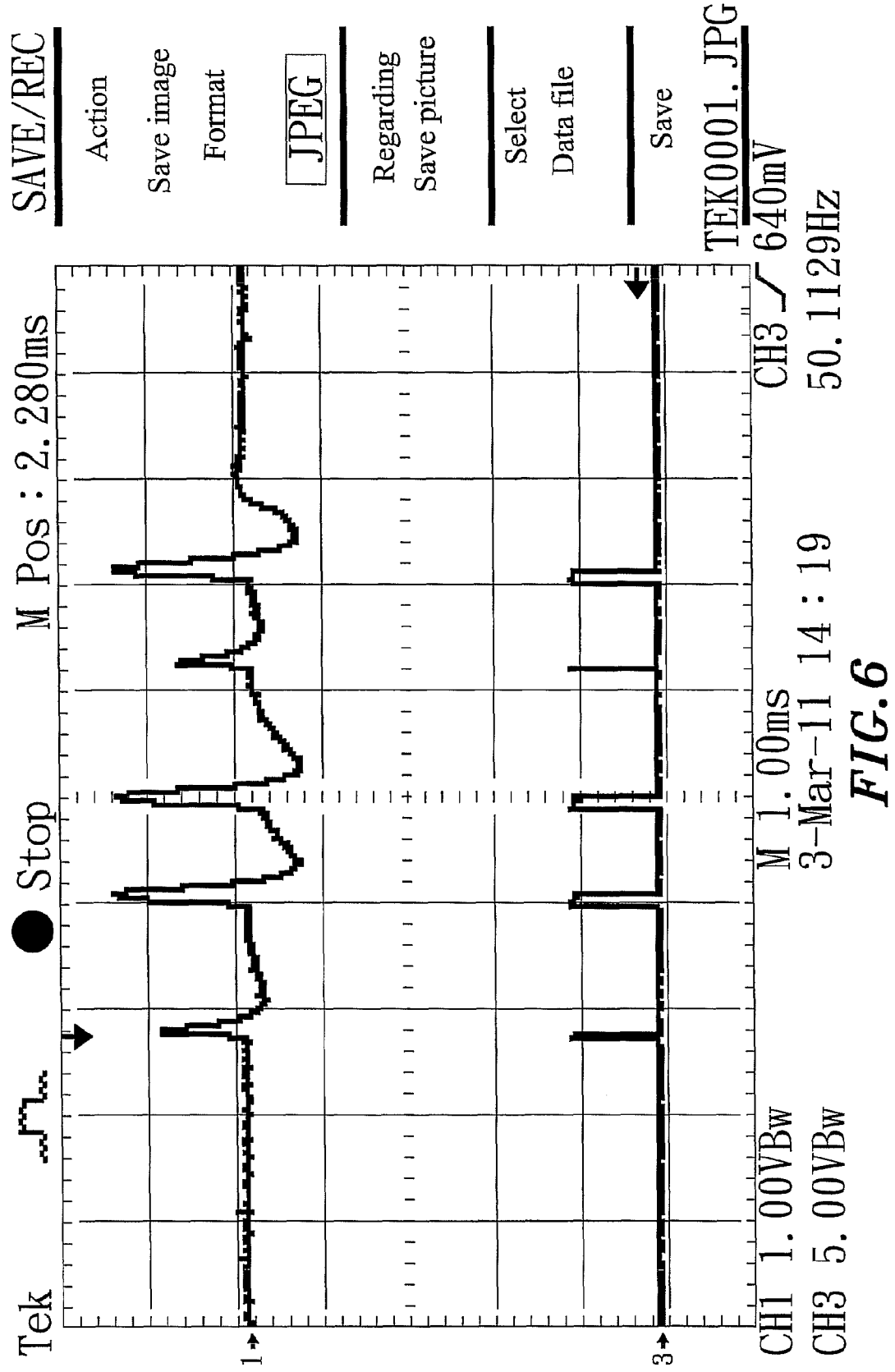
FIG. 6 is a forward phase data signal waveform chart in accordance with the present invention.

When the amplitude modulation circuit 24 of the receiving-end module 2 modulates a feedback signal provided by the receiving-end microprocessor 21 and drives the receiving-end coil 281 to transmit the modulated feedback signal to the supplying-end coil 171 of the receiving-end module 1 during a charging and data transmission operation between the supplying-end module 1 and the receiving-end module 2, the signal thus received by the supplying-end coil 171 is transmitted to the signal analysis circuit 13 and them the supplying-end microprocessor 11 for decoding (see also FIG. 6). The waveform of the signal modulated by the amplitude modulation circuit 24 (see the lower CH3 waveform illustrated in FIG. 6) is decoded by the signal analysis circuit 13 into a decoded waveform (see the upper CH1 waveform illustrated in FIG. 6). Before reaching the full load status during the charging and data transmission operation between the supplying-end module 1 and the receiving-end module 2, a sufficient voltage is provided to the DC-DC step-down converter 262 of the voltage stabilizer circuit 26 for voltage step-down. When the modulated signal is changed to high potential, the receiving-end coil 281 enters a heavy load effect, and the feedback causes a rise in peak at the supplying-end coil 171. At this time, signal fluctuation and the modulated signal have the same phase, and this waveform is defined to be a forward phase data signal.

Figure 7:
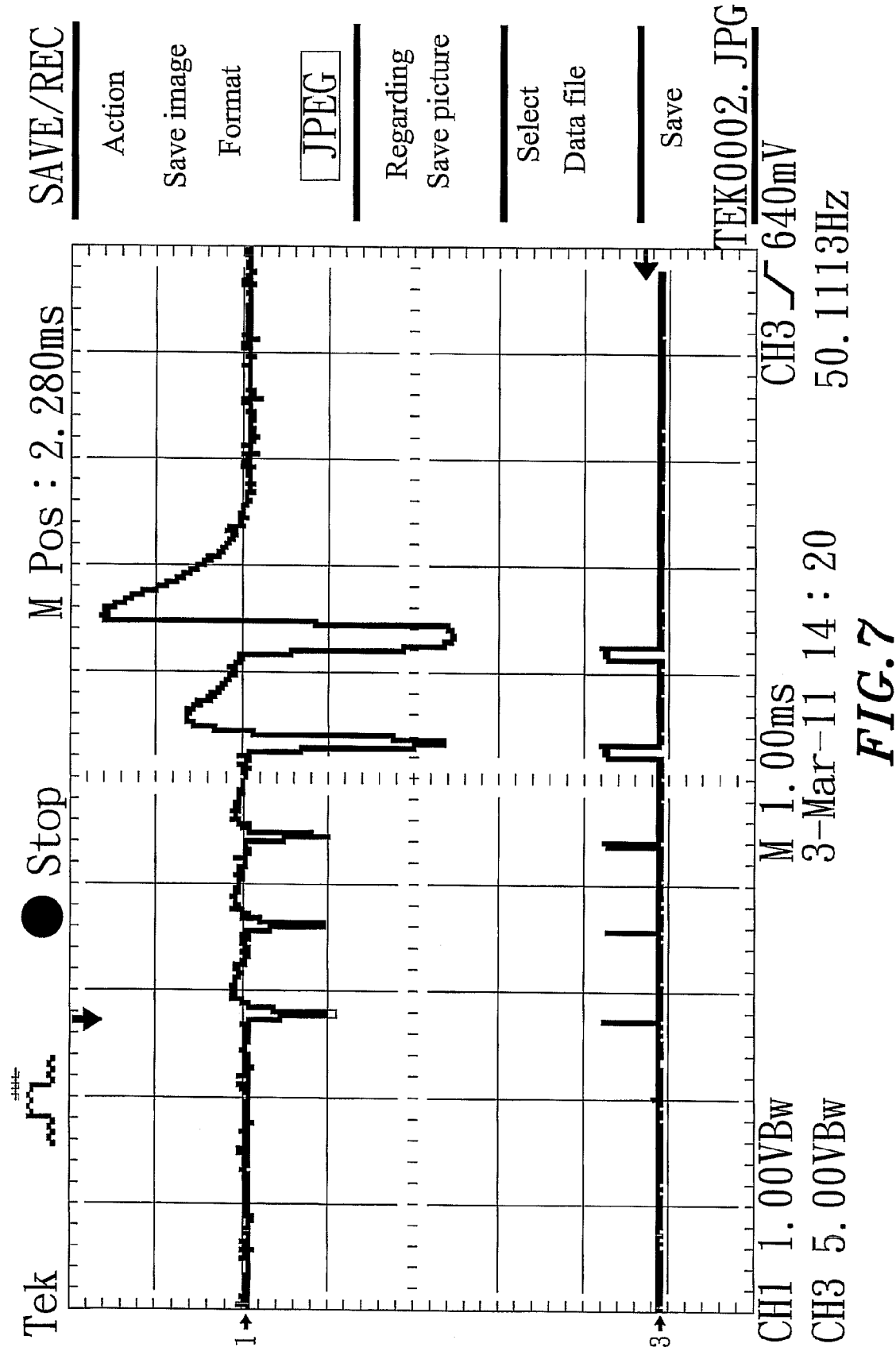
FIG. 7 is a reverse phase data signal waveform chart in accordance with the present invention.

When a large load of a low impedance is added to the power output terminal 263 of the voltage stabilizer circuit 26 during a charging and data transmission operation between the supplying-end module 1 and the receiving-end module 2, the DC-DC step-down converter 262 is approximately fully conducted to conduct the power supply from the buffer capacitor 261 to the power output terminal 263, minimizing the voltage difference therebetween and then entering full load. At this time, the energy emitted by the supplying-end module 1 does not satisfy the demand of the receiving-end module 2 for output, and the output power of the supplying-end module 1 must be increased (see also FIG. 7). When the receiving-end module 2 approaches full load, the waveform of the signal analysis circuit 13 (see the upper CH1 waveform illustrated in FIG. 7) is different from that when the receiving-end module 2 is not at full load. When the receiving-end module 2 is approximately at full load, the current passing through the receiving-end coil 281 during a non signal modulation period is greater than that during a signal modulation period. Thus, the signal fed back by the receiving-end coil 281 to the supplying-end coil 171 at full load is different from that not at full load. The waveform of the reverse phase data signal will also appear at the charging load that is connected to the high-power induction-type power supply system, allowing stable current output. During modulation of the signal, the current is lowered, and the phase of the feedback signal provided by the receiving-end coil 281 is reversed.

Further, the high-power induction-type power supply system enables the supplying-end module 1 to automatically regulate its output power to the receiving-end module 2 subject to change of the load at the power output terminal 263 of the voltage stabilizer circuit 26 of the receiving-end module 2. Because power transmission between the supplying-end module 1 and the receiving-end module 2 is done by means of induction coils without through any physical circuit means, a control system for controlling data transmission between the supplying-end module 1 and the receiving-end module 2 must be established. Further, the supplying-end module 1 requires the data of the load at the receiving-end module 2. By means of the arrangement of the two comparators built in the supplying-end microprocessor 11 of the supplying-end module 1 to match with the functioning of the shunt resistor unit 18, the receiving-end module 2 can still transmit a data code to the supplying-end module 1 stably during a change of the load, enabling the supplying-end module 1 to perform stable data signal transmission and power regulation and assuring a high level of system operating stability.

Figure 8:
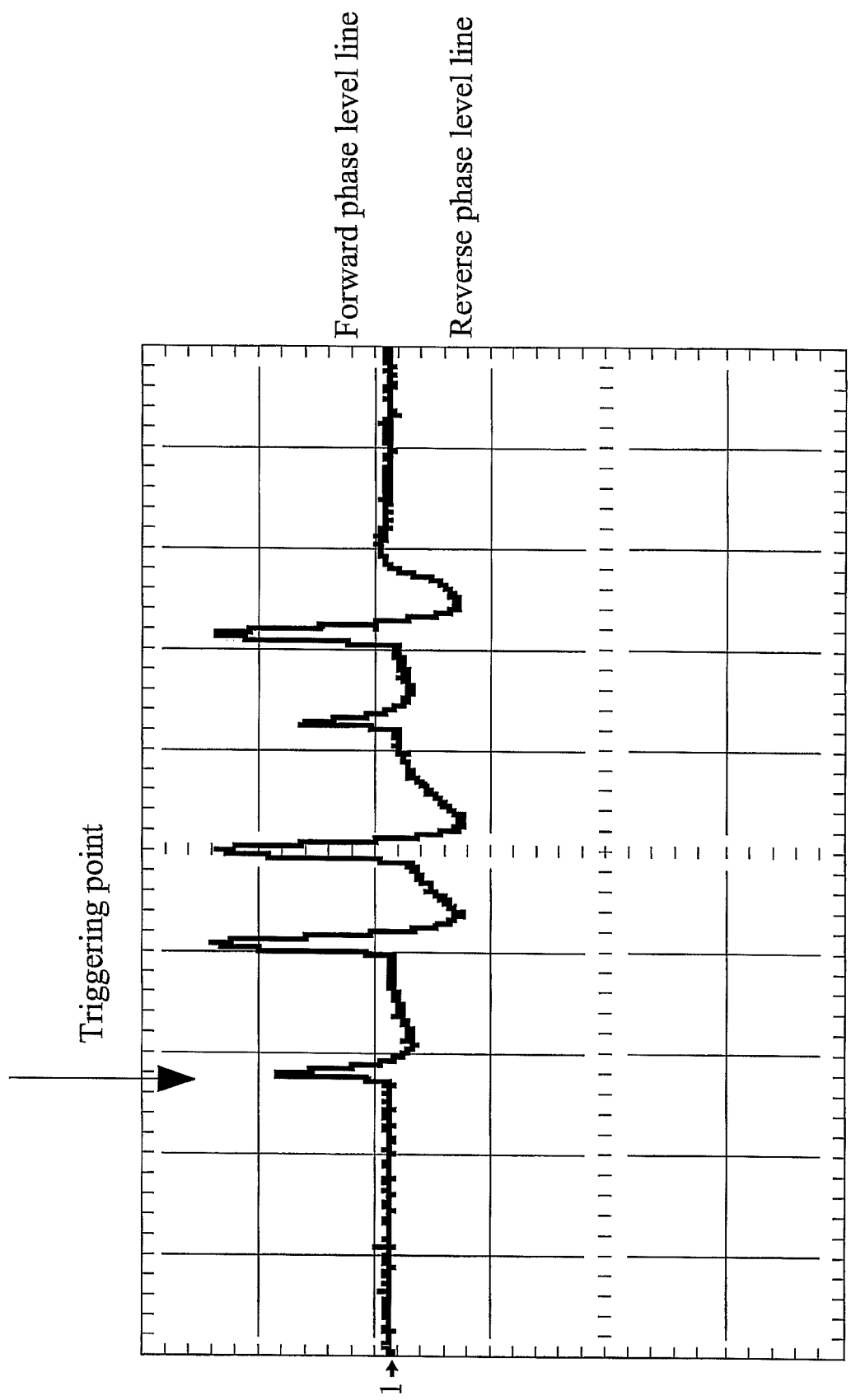
FIG. 8 is a schematic drawing illustrating the setting of the forward phase level line and reverse phase level line.

As stated above, the positive signal input ends 111;112 of the two built-in comparators of the supplying-end module 1 are respectively and electrically connected to the output end of the output end 134 of the signal analysis circuit 13 and the negative signal input ends 113;114 of the two built-in comparators of the supplying-end module 1 are respectively and electrically connected to the forward phase decoding shunt resistors 181;182 and reverse phase decoding shunt resistors 183;184 of the shunt resistor unit 18. Thus, the forward phase reference voltage level and the reverse phase reference voltage level are respectively set above and below the stabilized voltage value of the data signal (see also FIG. 8), avoiding erroneous triggering of the comparators under a no data signal status. When the comparators are firstly triggered, data code analysis program is started to decode the data code of the forward phase or reverse phase data signal.

Figure 9:
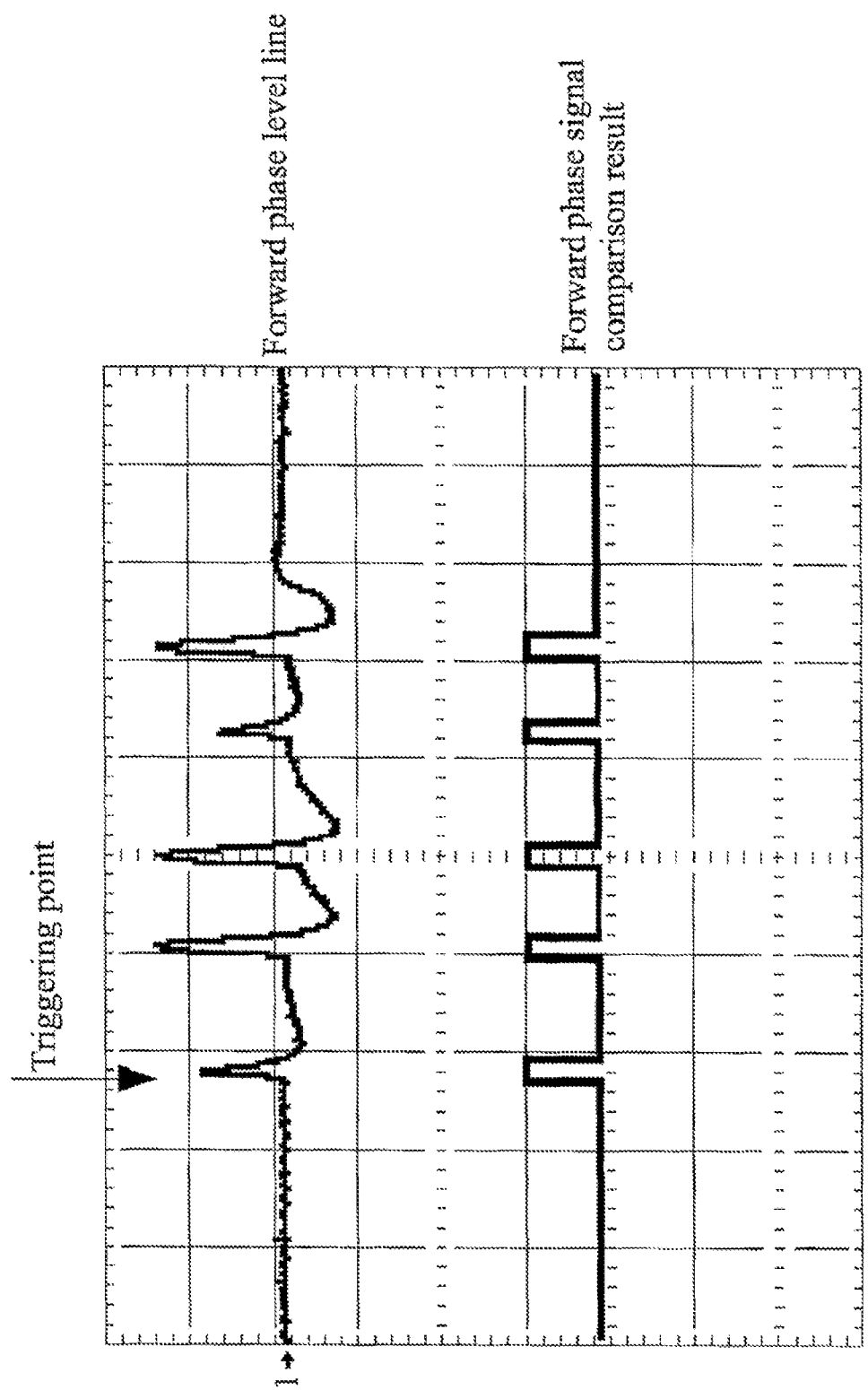
FIG. 9 is a forward phase waveform decoding chart in accordance with the present invention.

During a forward phase data signal decoding operation (see also FIG. 9), the voltage value of the forward phase data signal is compared to the forward phase reference voltage level. At this time, the decoded signal format is observed matching the waveform sent by the amplitude modulation circuit 24 of the receiving-end module 2, however the data signal width may be distorted during transmission. By means of a correction program, the original data code can be obtained.

Figure 10:
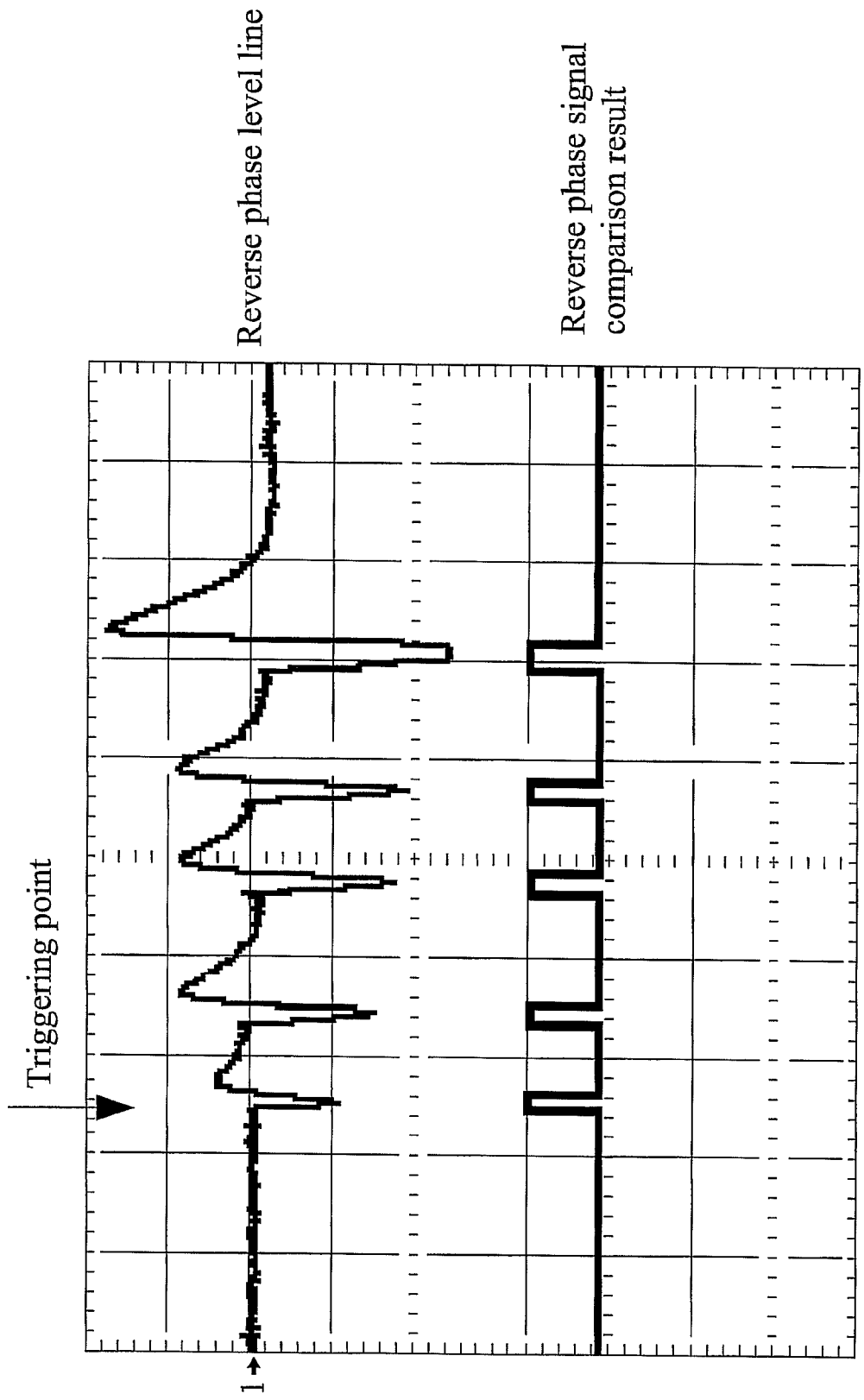
FIG. 10 is a reverse phase waveform decoding chart in accordance with the present invention.
Figure 11:
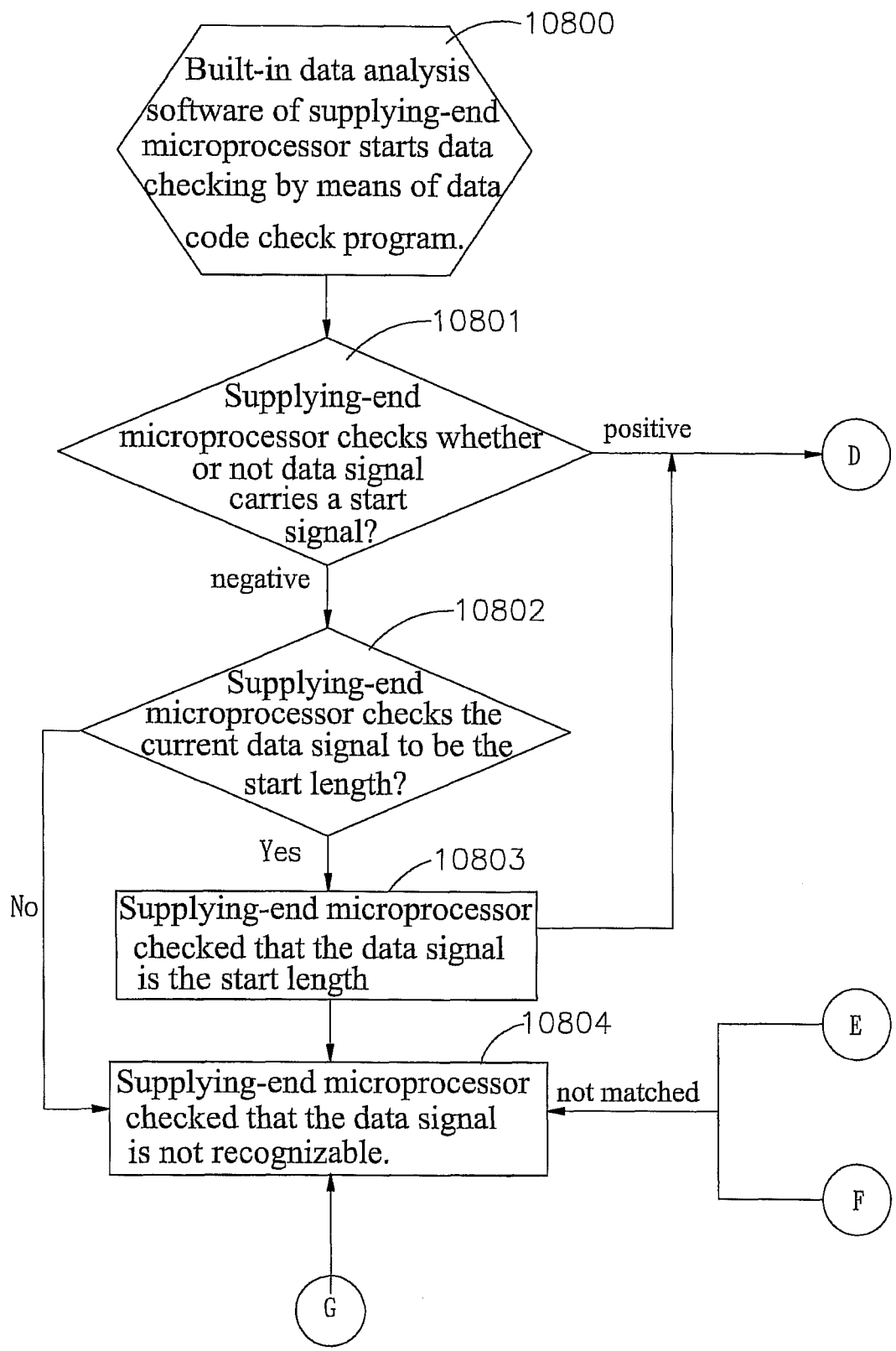
FIG. 11 is a data signal decoding flow chart in accordance with the present invention (I).
Figure 12:
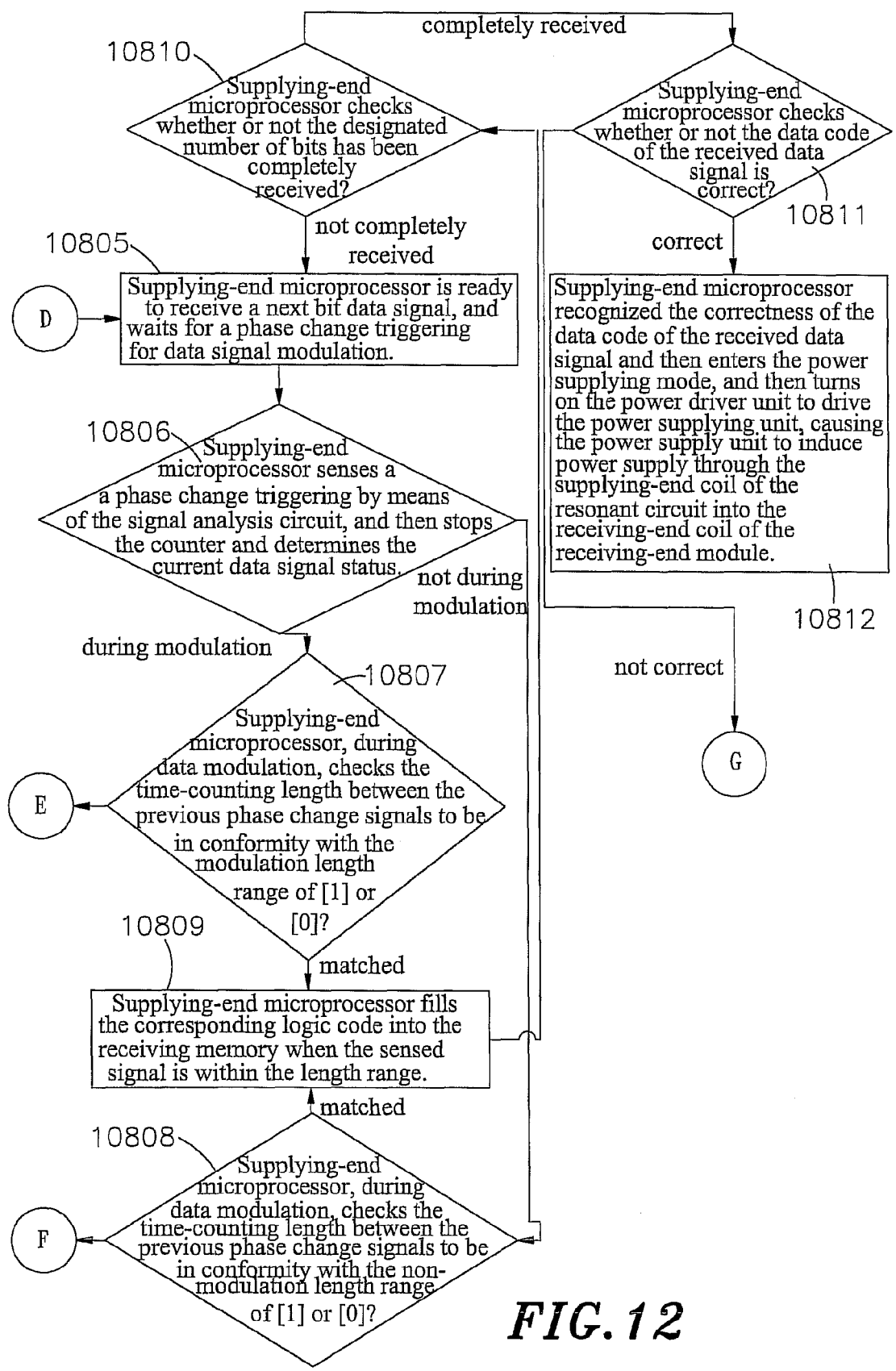
FIG. 12 is a data signal decoding flow chart in accordance with the present invention (II).

During a reverse phase data signal decoding operation (see also FIG. 10), the voltage value of the reverse phase data signal is compared to the reverse phase reference voltage level. When a reverse phase voltage is produced upon a first signal trigger, the system immediately enters the reverse phase signal decoding program to decode the data code.

The aforesaid bi-phase decoding is based on the first interruption triggering to determine the next step to be a forward phase decoding or reverse phase decoding operation, preventing the data signal produced after the first interruption triggering from erroneously triggering a level line that is not assigned. In case of forward phase signal triggering, the reverse phase signal interruption function will be off at first, and at the same time the counter will be started up. The length of the counting time of this counter is adapted for setting the maximum length of the data signal to be received. When the counting time is up, no matter what the back-end data signal receiving status is, the initialization will be reset to start bi-phase interruption triggering. Thus, a next interruption triggering can be reset even when the back-end data signal decoding fails.

Further, after triggering of an interruption at the first time, forward phase decoding or reverse phase decoding is determined, and one of the forward phase and reverse phase interruption functions is off, ensuring accurate target phase decoding upon an interruption during this period. Upon receipt of a data signal from the receiving-end module 2 during this stage, the supplying-end module 1 runs the data signal decoding operation subject to the following steps (see FIGS. 1, 2, 11 and 12):

(10800) The supplying-end microprocessor 11 of the supplying-end module 1 starts data checking by means of its built-in comparators, data analysis software and data code check program.

(10801) The supplying-end microprocessor 11 checks whether or not there the data signal carries a start signal? And then, the supplying-end module 1 proceeds to step (10802) when negative, or step (10805) when positive.

(10802) The supplying-end microprocessor 11 checks the current data signal to be the start length or not, and then proceeds to step (10803) when positive, or step (10804) when negative.

(10803) The supplying-end microprocessor 11 checked that the data signal is the start length, and then proceeds to step (10805).

(10804) The supplying-end microprocessor 11 checked that the data signal is not recognizable, and is then ready to turn off output.

(10805) The supplying-end microprocessor 11 is ready to receive a next bit data signal, and waits for a phase change triggering for data signal modulation.

(10806) The supplying-end microprocessor 11 senses a phase change triggering by means of the signal analysis circuit 13, and then stops the counter and determines the current data signal status, and then proceeds to step (10807) if during modulation, or step (10808) if not during modulation.

(10807) The supplying-end microprocessor 11, during data modulation, checks the time-counting length between the previous phase change signals to be in conformity with the modulation length range of [1] or [0], and then proceeds to step (10809) when matched, or returns to step (10804) when not matched.

(10808) The supplying-end microprocessor 11, during data modulation, checks the time-counting length between the previous phase change signals to be in conformity with the non-modulation length range of [1] or [0], and then proceeds to step (10809) when matched, or returns to step (10804) when not matched.

(10809) The supplying-end microprocessor 11 fills the corresponding logic code into the receiving memory when the sensed data signal is within the length range.

(10810) The supplying-end microprocessor 11 checks whether or not the designated number of bits has been completely received? And then, the supplying-end microprocessor 11 proceeds to step (10811) when completely received, or returns to step (10805) when not completely received.

(10811) The supplying-end microprocessor 11 checks whether or not the data code of the received data signal is correct? And then, the supplying-end microprocessor 11 proceeds to step (10812) when correct, or returns to step (10804) when not correct.

(10812) The supplying-end microprocessor 11 recognized the correctness of the data code of the received data signal and then enters the power supplying mode, and then turns on the power driver unit 12 to drive the power supplying unit 16, causing the power supply unit 16 to induce power supply through the supplying-end coil 171 of the resonant circuit 17 into the receiving-end coil 281 of the resonant circuit 28.

Further, by means of transmitting a short sensing signal, the supplying-end microprocessor 11 of the supplying-end module 1 can recognize the data signal transmitted by the receiving-end module 2. When the built-in comparators of the supplying-end microprocessor 11 of the supplying-end module 1 receive a noise or a data length not within the receiving range, the supplying-end microprocessor 11 immediately resets the bi-phase decoding program. After completion of the receipt of a data, the supplying-end microprocessor 11 will also resets the bi-phase decoding program, allowing a next interruption trigger to determine the decoding phase configuration.

As stated above, the invention provides a bi-phase decoding method for use in a high-power induction-type power supply system. By means of connecting the positive signal input ends 111;112 of the built-in comparators of the supplying-end microprocessor 11 to the output end 134 of the signal analysis circuit 13 and the negative signal input ends 113;114 of the comparators to the forward phase decoding shunt resistors 181;182 and reverse phase decoding shunt resistors 183;184 of the shunt resistor unit 18 respectively, the two comparators compare the voltage at the positive signal input ends 111;112 with the voltage at the negative signal input ends 113;114 and then output the comparison result for further digital logic level determination. Thus, by means of the feedback signal provided by the receiving-end coil 281 of the resonant circuit 28 to the supplying-end coil 171 of the resonant circuit 17, the data signal can be accurately decoded even when the receiving-end module 2 is at full load, assuring system operation stability and synchronous transmission of power supply and data signal. Thus, by means of bi-phase decoding between the supplying-end module 1 and the receiving-end module 2, the invention allows a synchronous charging operation.

In conclusion, the high-power induction-type power supply system and its bi-phase decoding method of the present invention has the features and advantages as follows:

1. The supplying-end microprocessor 11 of the supplying-end module 1 has built-in comparators for accurate decoding of data signal code during full load of the receiving-end module 2, ensuring system operating reliability.

2. By means of connecting the positive signal input ends 111;112 of the built-in comparators of the supplying-end microprocessor 11 to the output end 134 of the signal analysis circuit 13 and the negative signal input ends 113;114 of the comparators to the forward phase decoding shunt resistors 181;182 and reverse phase decoding shunt resistors 183;184 of the shunt resistor unit 18 respectively, the two comparators compare the voltage at the positive signal input ends 111;112 with the voltage at the negative signal input ends 113;114 and then output the comparison result for accurate digital logic level determination so that the built-in software programs of the supplying-end microprocessor 11 can accurately decode the data code of the data signal provided by the receiving-end module 2.

As stated above, the high-power induction-type power supply system in accordance with the present invention comprises a supplying-end module 1 consisting of a supplying-end microprocessor 11, a power driver unit 12, a signal analysis circuit 13, a coil voltage detection circuit 22, a display unit 15, a power supplying unit 16, a resonant circuit 28, a supplying-end coil 171 and a shunt resistor unit 18, and a receiving-end module 2 consisting of a receiving-end microprocessor 21, a voltage detection circuit 22, a rectifier and filter circuit 23, an amplitude modulation circuit 24, a protection circuit breaker 25, a voltage stabilizer circuit 26, a DC-DC buck converter, a resonant circuit 28 and a receiving-end coil 2. Subject to time series arrangement, the high-power induction-type power supply system allows transmission of data signal in a stable manner during a charging operation, assuring system operation stability and low power loss.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A bi-phase data signal decoding method used in a high-power induction-type power supply system consisting of a supplying-end module and a receiving-end module for decoding a data code of a data signal, comprising steps of:
    (a) set a built-in forward phase comparator and a built-in reverse phase comparator of a supplying-end microprocessor of the supplying-end module to initialize interruption data analysis and to clear register data;
    (b) wait for an interruption triggering;
    (c) determine whether or not the interruption triggered, and then proceed to step (e) when positive or step (d) when negative;
    (d) determine whether or not a maximum data length counter is overflow, and then return to step (a) when positive or step (b) when negative;
    (e) judge a phase to be a forward phase or a reverse phase, and then proceed to step (f) when the forward phase is judged, or step (g) when the reverse phase is judged;
    (f) a first trigger is judged to be a forward phase, thus, set to turn off reverse phase interruption triggering and to drive the maximum data length counter to start counting for enabling every interruption triggered during a time period of step (f) to be a forward phase triggering until that a new setting is made, and then proceed to step (h);
    (g) the first trigger is judged to be a reverse phase, thus set to turn off forward phase interruption triggering and to drive the maximum data length counter to start counting for enabling every interruption triggered during a time period of step (g) to be a reverse phase triggering until that a new setting is made, and then proceed to step (h);
    (h) check a signal length to be in match with a set length or not, and then proceed to step (i) when positive or step (j) when negative;
    (i) the signal length is checked in match with the set length, thus, set bit data and then proceed to step (k);
    (j) the signal length is checked not in match with the set length, thus, a signal is determined to be a noise, and then clear existing data and re-set to return to step (a);
    (k) check whether or not a set number of bits has been received, and then proceed to step (l) when negative or step (m) when positive;
    (l) receiving of the set number of bits is not completed, thus, wait for a next interruption triggering and then return to step (c);
    (m) the set number of bits has been completely received, thus, set data into a data register, and then initialize a built-in data analysis program and then run step (n) and step (a) synchronously;
    (n) end data receiving.

2. The bi-phase data signal decoding method as claimed in claim 1, wherein said supplying-end module comprises a supplying-end microprocessor having built therein a forward phase comparator and a reverse phase comparator.

3. The bi-phase data signal decoding method as claimed in claim 1, wherein said supplying-end module comprises a supplying-end microprocessor having built therein a forward phase comparator and a reverse phase comparator, said forward phase comparator and said reverse phase comparator each comprising a positive signal input end for the input of a data signal and a negative signal input end for the input of a reference voltage.

4. The bi-phase data signal decoding method as claimed in claim 1, wherein said supplying-end module consists of a supplying-end microprocessor, a power driver unit, a signal analysis circuit, a coil voltage detection circuit, a display unit, a power supplying unit, a resonant circuit, a supplying-end coil and a shunt resistor unit.

5. A high-power induction-type power supply system comprising a supplying-end module and a receiving-end module, wherein:
    said supplying-end module comprises a supplying-end microprocessor having built therein a forward phase comparator and a reverse phase comparator, a power driver unit, a signal analysis circuit, a coil voltage detection circuit, a display unit, a power supplying unit, a resonant circuit, a supplying-end coil and a shunt resistor unit, said power driver unit, said signal analysis circuit, said coil voltage detection circuit, said display unit, said power supplying unit and said shunt resistor unit being respectively electrically coupled to said supplying-end microprocessor, said supplying-end coil being electrically coupled with said resonant circuit and adapted for transmitting power supply and data signal to said receiving-end module wirelessly;
    said receiving-end module comprises a receiving-end microprocessor, a voltage detection circuit, a rectifier and filter circuit, an amplitude modulation circuit, a protection circuit breaker, a voltage stabilizer circuit, a DC-DC buck converter, a resonant circuit and a receiving-end coil, said voltage detection circuit, said rectifier and filter circuit, said amplitude modulation circuit, said protection circuit breaker, said voltage stabilizer circuit and said DC-DC buck converter being respectively electrically coupled with said receiving-end microprocessor, said rectifier and filter circuit, said protection circuit breaker and said DC-DC buck converter being electrically connected in series, said receiving-end resonant circuit and said receiving-end coil being electrically connected in parallel to said rectifier and filter circuit and electrically connected with said amplitude modulation circuit in series, said voltage detection circuit, said protection circuit breaker, said voltage stabilizer circuit and said DC-DC buck converter being respectively electrically coupled with said rectifier and filter circuit, said rectifier and filter circuit and said amplitude modulation circuit being respectively electrically coupled with said receiving-end resonant circuit, which is electrically coupled with said receiving-end coil.

6. The high-power induction-type power supply system as claimed in claim 5, wherein said power driver unit comprises a MOSFET (Metal-Oxide-Semiconductor Field-Effect Transistor) driver, a high-end MOSFET component and a low-end MOSFET component, said MOSFET driver being electrically coupled with said supplying-end microprocessor, said high-end MOSFET component and said low-end MOSFET component, said high-end MOSFET component and said low-end MOSFET component being respectively electrically coupled with said resonant circuit, said high-end MOSFET component being also electrically coupled with said power supplying unit and said resonant circuit.

7. The high-power induction-type power supply system as claimed in claim 5, wherein said power supplying unit of said supplying-end module comprises a power source, and two current sensing shunt resistors electrically connected in series to said power source.

8. The high-power induction-type power supply system as claimed in claim 5, wherein said display unit of said supplying-end module is selected from the group of liquid crystal display screen, LED display screen and cold light display screen.

9. The high-power induction-type power supply system as claimed in claim 5, wherein said voltage detection circuit comprises a plurality of resistors electrically connected in series to said supplying-end microprocessor, and a plurality of sensing points electrically connected with the resistors, said rectifier and filter circuit, said protection circuit breaker and said DC-DC buck converter.

10. The high-power induction-type power supply system as claimed in claim 5, wherein said rectifier and filter circuit comprises a rectifier and a filter capacitor respectively electrically connected in parallel to said voltage detection circuit, said protection circuit breaker and said DC-DC buck converter.

11. The high-power induction-type power supply system as claimed in claim 5, wherein said amplitude modulation circuit comprises an inductor, a rectifying diode and a MOSFET component electrically connected in series.

12. The high-power induction-type power supply system as claimed in claim 5, wherein said protection circuit breaker comprises a resistor, a P-type MOSFET component and an N-type MOSFET component, the resistor, P-type MOSFET component and N-type MOSFET component of said protection circuit breaker being electrically connected in series, said N-type MOSFET component being electrically coupled with said receiving-end microprocessor.

13. The high-power induction-type power supply system as claimed in claim 5, wherein said voltage stabilizer circuit comprises a buffer capacitor, a DC-DC step-down converter and a power output terminal, the buffer capacitor and DC-DC step-down converter of said voltage stabilizer circuit being electrically coupled to said protection circuit breaker.

14. The high-power induction-type power supply system as claimed in claim 5, wherein said supplying-end microprocessor of said supplying-end module has built therein a forward phase comparator and a reverse phase comparator, said forward phase comparator and said reverse phase comparator each comprising a positive signal input end for the input of a data signal and a negative signal input end for the input of a reference voltage.

* * * * *